Figure 3:
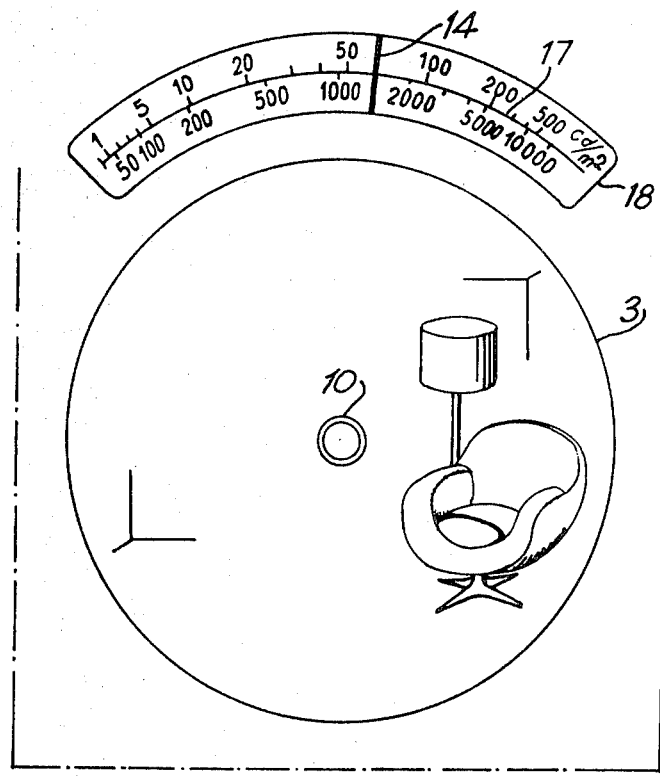

United States Patent

[11] 3,591,297

| [72] | Inventor | Bo Anders Vilhelm Hagner<br>11 Orrvagen, Nasbypark, Sweden |
|---|---|---|
| [21] | Appl. No. | 773,735 |
| [22] | Filed | Nov. 6, 1968 |
| [45] | Patented | July 6, 1971 |
| [32] | Priority | Nov. 10, 1967 |
| [33] | | Great Britain |
| [31] | | 51204/67 |

[54] PHOTOMETRIC INSTRUMENT
4 Claims, 4 Drawing Figs.

[52] U.S. Cl. .................................................. 356/219,
356/220, 356/222
[51] Int. Cl. .................................................. G01j 1/42
[50] Field of Search ........................................... 356/222,
219, 220, 221, 224, 203; 88/1.5

[56] References Cited
UNITED STATES PATENTS

| 2,013,363 | 9/1935 | Rizdorfer | 356/219 |
| 2,145,147 | 1/1939 | Wolferz | 356/222 |
| 2,994,257 | 8/1961 | Papke | 88/1.5 (UX) |
| 3,074,312 | 1/1963 | Olson | 356/203 X |
| 3,087,379 | 4/1963 | Rogers | 356/219 |
| 3,212,394 | 10/1965 | Norwood | 356/222 |

Primary Examiner—Ronald L. Wibert
Assistant Examiner—T. Major
Attorney—Baldwin, Wight & Brown ABSTRACT: A photometric instrument having two photoelectric cells coupled to a common moving coil meter, one of said cells being arranged within a casing to measure, in conjunction with an optical viewing system, a small viewing angle, and the other of said cells being adapted to be used externally of said casing to measure illumination and eventual luminance within a large viewing angle. The pointer of said coil meter is common to two reading scales one of which can be viewed through the optical view system and the other of which can be viewed from a position external of said casing.

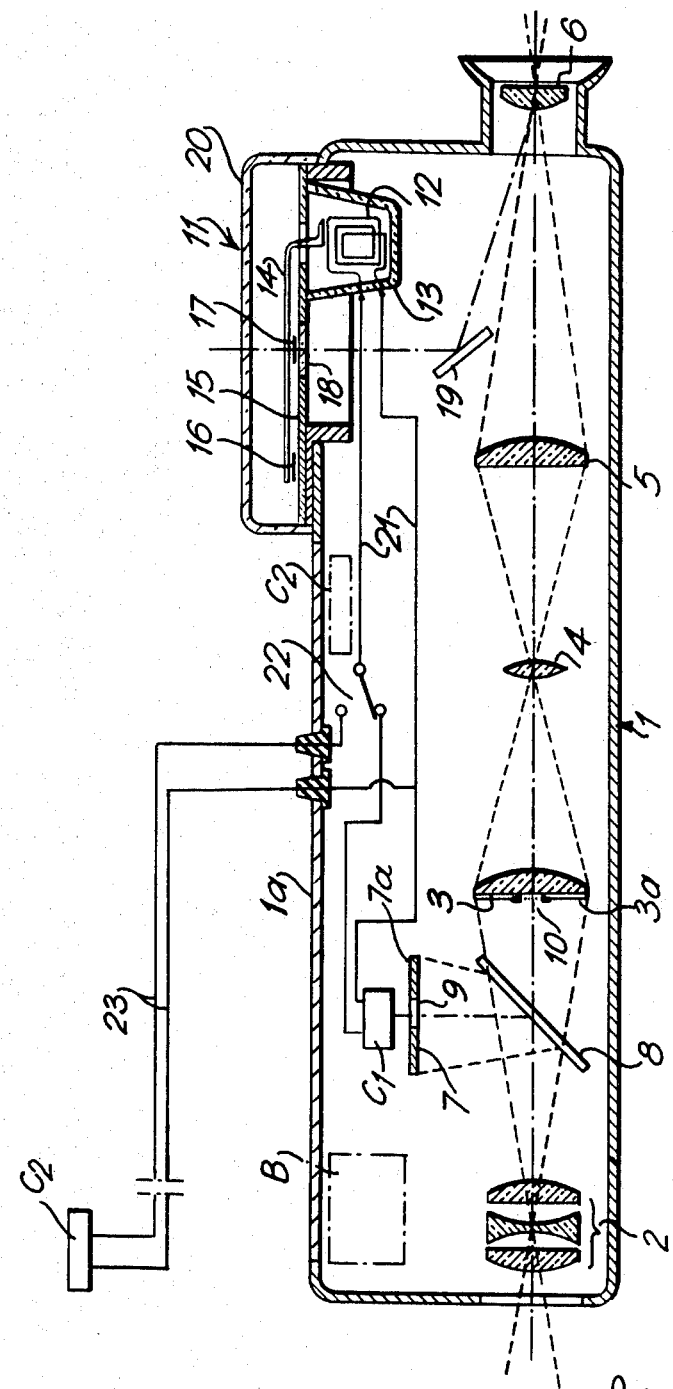

PHOTOMETRIC INSTRUMENT

This invention relates to an improved photometric instrument of the photoelectric type.

The demand for improving the quality of lighting installations has, during recent years, been increased and a need has been developed, for example by architects and consulting engineers, to provide for the measurement not only of luminous power for experiments with illumination systems but also for luminous glare indices, reflection factors, transmission factors etc.

Known measuring instruments which are at present available for this purpose are generally complicated and expensive, or they do not meet all the demands made upon them.

It is among the objects of the present invention to provide a photometric instrument which is portable, is simple and robust in construction, and at the same time can be produced at a relatively low cost compared with existing instruments.

The quality of a lighting installation depends, among other things, on the degree of direct glare or luminous intensity of light sources such as electric lamps, and on the degree of reflected glare from, for example, office machines, furniture, etc.

The determination of the direct glare of light sources is standardized by the I.E.S. (Illuminating Engineering Society) based on research work carried out at the B.R.S. (Building Research Station) but, as yet, no standard formula for the determination of reflected glare has been produced. However, work is in progress by a panel appointed by the I.E.S. to produce such a formula which will probably necessitate determining luminance of reflection, solid angle of reflection and adaption luminance, and will therefore require the same type of measurements used with the existing formula for the determination of direct glare.

The B.R.S. formula for determining the glare index ($B$) from light sources is as follows:

The degree of glare ($G_n$) from a light source ($n$) is $$G_n = \frac{L_n^{1.6} \times \omega_n^{0.8}}{L_{ad}} \times P_n$$

where:

$L_n$ = the average luminance of the luminous area of a light source measured from a given observation point.

$\omega_n$ = the solid angle of the luminous areas of the light source also taken from the said given observation point.

$P_n$ = the position of the light source in the viewing field which is given certain predetermined factors.

$L_{ad}$ = the adaption luminance i.e. the general overall background luminance produced as a result of the influence of the light sources on the area, e.g. room, being considered.

The glare index ($B$) from the said given observation point is then determined as follows:

$$B = 10 \times 10_{log} \sum_n G_n$$

From the above, it appears desirable to provide an instrument with which one can measure the values of $L_n$, $\omega_n$ and $L_{ad}$ i.e. an instrument to measure the luminance of a light source within a small angle of say 1° so that sources of small surface area, e.g. a single fluorescent tube, can be taken into account and, at the same time, to measure the adaption luminance which produces a general overall reading over a wide angle of approximately 180°.

It is therefore further among the objects of the present invention to provide a photometric instrument which is capable of use in determining, in a simple manner, glare indices according to the B.R.S. formula, and for use in determining other photometric factors, for example measurements of the degree of reflected glare, measurements of illumination, reflection factors, light transmission factors, photographic exposure values or any other light-producing factors.

According to the present invention, there is provided a photometric instrument comprising a first photoelectric cell optically coupled to an optical viewing system to measure luminance within a small viewing angle, and a second photoelectric cell to measure illumination and eventual luminance within a large viewing angle, wherein the first cell is arranged internally of the instrument and the second cell is arranged externally of the instrument, the two cells being coupled to a single moving coil meter the reading scale of which is adapted to be read both internally and externally of the instrument. By " small viewing angle" is meant an angle of say 1° to 3° and by "large viewing angle" is meant an angle of up to approximately 180°.

Figure 2:
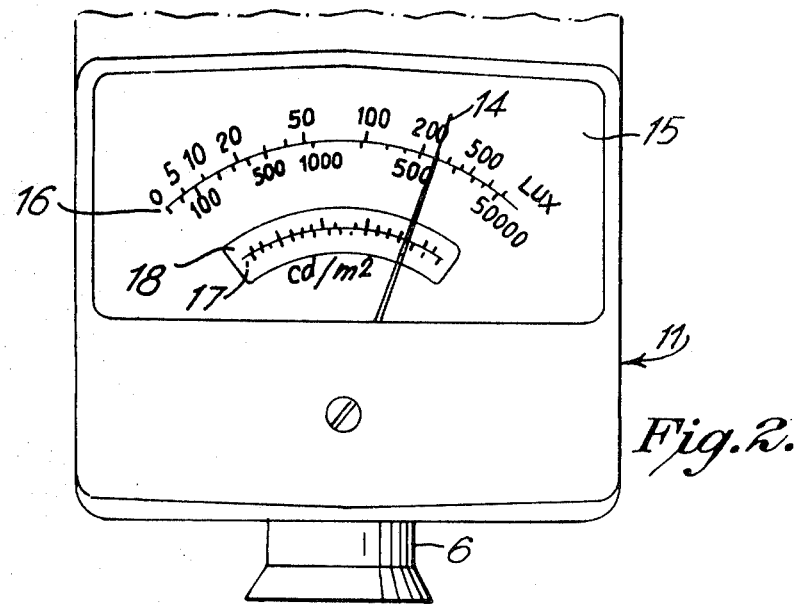
Figure 4:
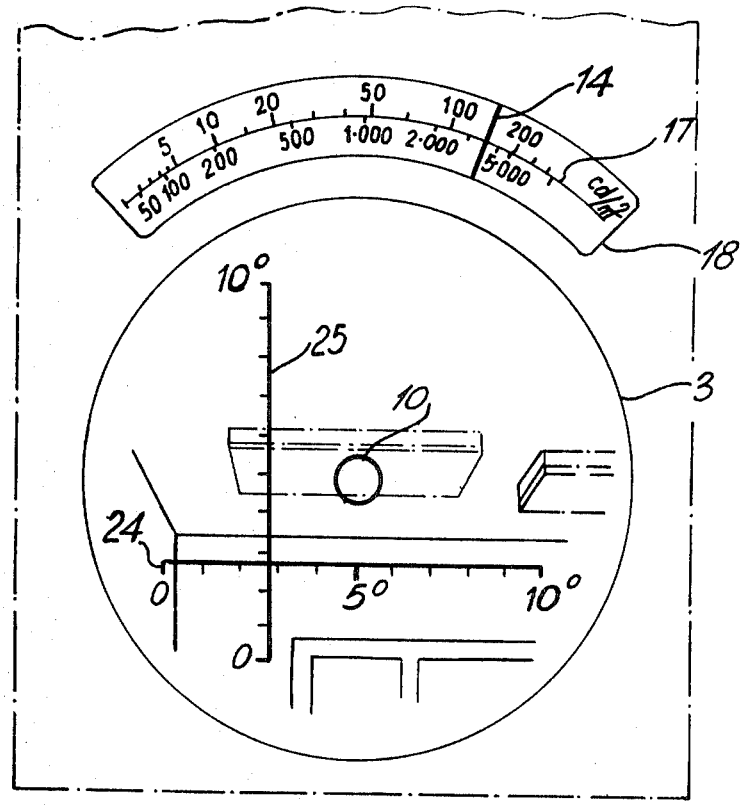

The invention is illustrated by way of example in the accompanying drawings in which, FIG. 1 is a longitudinal schematic section through an instrument according to the invention, FIG. 2 is a part plan view of FIG. 1 showing the moving coil device, FIG. 3 is a pictorial cross section showing the method of measuring luminance within a small angle, and FIG. 4 is a pictorial cross section showing the method of determining solid angles.

Referring to the drawings there is shown a photometric instrument comprising a casing 1 within which is arranged an optical viewing system consisting of an objective lens 2, a field lens 3, a rectifier lens 4, an inverted image plane field lens 5 and an eyepiece lens 6, it being understood that an image produced in the field lens 3 is reversed by the rectifying lens 4 in the image plane field lens 5 which is viewed through the eyepiece lens 6.

A further image plane 7 is produced by, for example, a semitransparent mirror 8 arranged at an angle between the objective lens 2 and the field lens 3, the mirror 8 projecting, through an aperture 9 in a nontransparent mask 7a disposed in the image plane 7, a beam of reflected light onto a photoelectric cell C1. arranged within the casing 1.

An image plane 3a associated with the field lens 3 has marked thereon a symbol 10 corresponding to the aperture 9 in the form of, for example, a circle which defines the viewing and measuring point of the optical viewing and measuring system. Thus, it will be appreciated that the area of the light beam projected through the aperture 9 corresponds to the area viewed through the optical system.

A moving coil meter 11 is arranged on, or close to, one wall of the casing 1 and includes a coil 12 arranged in a coil cup 13, a pointer 14, a scale plate 15 provided with, or having associated therewith, a first reading scale 16 and a second reading scale 17. The second reading scale 17 is associated with an arcuate slot, or an arcuate transparent portion 18 in the otherwise opaque scale plate 15, so that it can be read by an observer through the eyepiece lens 6 with the aid of an angularly disposed mirror 19 which is offset from the viewing system. The reading scale 16 can be read from a position external of the casing 1 through a transparent cover 20.

The coil meter is connected electrically through leads 21, and a changeover switch 22, with the cell C1 and, through leads 23, with a second photoelectric cell C2. The cell C2 as indicated in chain-dot lines is preferably housed, when not in use, within which is formed with a hinged lid 1a, the casing 1 and the leads 23 are of such length that it can be used in positions remote from the instrument. The changeover switch 22 enables one or other of the cells to be used according to the use to which the instrument is being put. Electric power is provided by a battery B arranged within the casing 1.

Thus, in use with the switch 22 in the position shown in FIG. 1, the instrument is directed from an observation point at a light source and a reading of the average luminance within the circle 10 is transmitted through the cell C1 to the coil meter 11, the pointer 14 thereof registering a reading on the scale 17 which is calibrated in candelas per square meter or any other unit of luminance. The reading registered on the scale 17 can be seen by the observer through the eyepiece lens 6 by using the mirror 19. Thus, the instrument can be directed at the light source and a reading taken on the scale 17 in one operation.

In order to measure illumination, adaption luminance, or luminance over a large viewing angle, the switch 22 is changed over so that the cell C2 is coupled to the coil meter 11. In this case, the cell C2 is placed in the required position at the observation point and the pointer 14 registers a reading on the scale 16 which, for example, is calibrated in lux or any other unit of illuminance. The reading registered on the scale 16 is viewed from a position external of the instrument.

In this latter respect, the determination of average luminance within a large viewing angle (i.e. approximately 180°) could, when using a standard photoelectric cell, be effected by multiplying the reading produced on scale 16 by a correction factor $k/\pi$ where $K =$ the unit of illumination being used. Furthermore, optical adapters could be coupled to the cell C2 in order to measure other large viewing angles of, for example, approximately 90°, or to measure a particular zone or area, for example in the form of an annulus. Thus, by knowing the measuring angle or zone of the adapter, the correction factor can be calculated in known manner, or alternatively, the correction factor for each adapter can be predetermined and marked on the adapter.

The instrument is further provided with means for measuring solid angles such means consisting, for example, of two perpendicularly disposed scales 24 and 25 which are calibrated in units of 1°. The scales may be provided on the image plane 3a or the image plane field lens 5.

The solid angle of a light source can be measured at the same time as the luminance of that light source is measured since, after directing the circle 10 at the light source and taking a reading on the scale 17, the number of 1° units of the scales 24 and 25 can then be determined and the solid angle calculated in known manner. Although the scales 24 and 25 for measuring solid angles have been described as being straight perpendicularly disposed graduated lines, it will be understood that they may take other convenient forms such as concentric circles or rectangles.

Thus, by providing two separate photoelectric cells coupled to a common moving coil meter, there is provided an instrument which is compact and is relatively cheap to manufacture, and one which can be used for a variety of measuring purposes.

I claim:

1. A photometric instrument comprising, in combination, a casing; an optical viewing system arranged within said casing for viewing an external scene; a first photoelectric cell for sensing illumination of said external scene within a small viewing angle coupled to said optical system; a second photoelectric cell remotely positionable by lead means outside of said casing for sensing illumination of a scene within a large viewing angle independently of said viewing system; a meter within said casing and having a pointer, said meter being selectively coupled alternatively by switch means to said first photoelectric cell and said lead means for alternatively receiving signals from said first photoelectric cell and said second photoelectric cell; an opaque scale plate formed with an arcuate transparent portion operatively associated with said meter, said scale plate having a first reading scale arranged on said transparent portion for registering signals from said first photoelectric cell and a second reading scale viewable externally of said casing arranged on an opaque portion of said scale plate for registering signals from said second photoelectric cell, said pointer being common to both of said reading scales; and means including an angled mirror within said casing and offset from said optical viewing system for viewing said first reading scale internally via an eyepiece associated with said viewing system.

2. An instrument as claimed in claim 1 in which an image plane of said optical viewing system is provided with a scale means for use in measuring solid angles.

3. An instrument as claimed in claim 1, wherein said meter is a moving coil meter.

4. An instrument as claimed in claim 1, including means for removably storing said second photoelectric cell within said casing.